United States Patent
Plain et al.

(10) Patent No.: US 7,343,584 B1
(45) Date of Patent: Mar. 11, 2008

(54) AUTOMATED CONFIGURATION OF SYSTEMS COMPRISING PRODUCT COMPONENTS OF HETEROGENEOUS CONTEXTS

(75) Inventors: Kevin Richard Plain, Leander, TX (US); Thomas John Rohloff, Cupertino, CA (US)

(73) Assignee: Versata Development Group, Inc., Austin, TX (US)

( * ) Notice: Subject to any disclaimer, the term of this patent is extended or adjusted under 35 U.S.C. 154(b) by 267 days.

(21) Appl. No.: 09/978,470

(22) Filed: Oct. 16, 2001

(51) Int. Cl.
*G06F 9/44* (2006.01)
*G06N 5/02* (2006.01)

(52) U.S. Cl. .................... 717/104; 700/103; 706/46

(58) Field of Classification Search ............. 717/116, 717/121, 169, 175; 706/46–50; 712/228; 700/103
See application file for complete search history.

(56) References Cited

U.S. PATENT DOCUMENTS

| | | | | |
|---|---|---|---|---|
| 5,515,524 A | * | 5/1996 | Lynch et al. .................. 703/13 |
| 5,617,514 A | * | 4/1997 | Dolby et al. .................. 706/45 |
| 5,721,824 A | * | 2/1998 | Taylor ........................ 709/203 |
| 5,825,651 A | * | 10/1998 | Gupta et al. ................ 700/103 |
| 5,963,953 A | * | 10/1999 | Cram et al. ................. 707/102 |
| 6,151,643 A | * | 11/2000 | Cheng et al. ................. 710/36 |
| 6,157,922 A | * | 12/2000 | Vaughan ..................... 706/46 |
| 6,314,567 B1 | * | 11/2001 | Oberhauser et al. ........ 717/170 |
| 6,341,276 B1 | * | 1/2002 | Bender et al. ............... 706/50 |
| 6,341,369 B1 | * | 1/2002 | Degenaro et al. .......... 717/117 |
| 6,367,075 B1 | * | 4/2002 | Kruger et al. .............. 717/169 |

OTHER PUBLICATIONS

Kramer, Bryan M., "Knowledge-Based Configuration of Computer Systems Using Hierarchical Partial Choice," IEEE, 1991, pp. 368-375.

* cited by examiner

*Primary Examiner*—Tuan Dam
*Assistant Examiner*—Michael Yigdall
(74) *Attorney, Agent, or Firm*—Hamilton & Terrile, LLP; Kent B. Chambers

(57) ABSTRACT

An automated heterogeneous configurator employs a technique by which the state of a context can be changed and restored automatically to facilitate the configuration of systems having components that span multiple contexts. The technique employs a high level constraint that is programmed into the component class of a model that requires a component object to determine the appropriate context for that object at the beginning of its installation within the configuration, and if the current state of the context is not that which is appropriate for the object component, the installation process for the component changes the state of the context to reflect that which is appropriate for the component. The most common context is the product line context, but any other context pertinent to the configuration of heterogeneous systems can be applied to this technique.

26 Claims, 2 Drawing Sheets

AUTOMATED CONFIGURATION OF SYSTEMS COMPRISING PRODUCT COMPONENTS OF HETEROGENEOUS CONTEXTS

BACKGROUND OF THE INVENTION

1. Field of the Invention

The present invention relates to the field of automated system configuration, and more particularly to the configuration of systems that include groups of components spanning more than one context, such as a product line.

2. Description of the Related Art

The growth of commerce conducted over the Internet has engendered numerous techniques by which automated business transactions may be facilitated between buyers and sellers. One such technique is automated product configuration. Automated configuration is typically offered to potential buyers by sellers of complex systems which are typically products made up of large numbers of interconnected components, such as computers, servers, automobiles, or any product which may present multiple combinations of component options to a potential buyer. Typically, the seller provides a user interface (UI) by which the buyer is guided through a process of selecting among various options and quantities thereof in configuring a product or system for purchase, and often provides the buyer with a price quote for the desired combination of options as specified by the buyer through the UI.

When configuration is offered over the Internet, the buyer typically accesses a product configurator using a browser over the Internet. The buyer's selections are typically captured by the control inputs of the UI that is executed and displayed using the buyer's web browser. The selections are transmitted over the Internet by the browser in the form of requests to a server running an application on behalf of a seller. The transmission of requests is typically initiated over the Internet in response to an action taken by the buyer that indicates that the buyer has made the desired selections and would like to initiate the configuration process. The server running the configuration application program receives the requests (i.e. processes the values or states of the control inputs of the UI) and initiates the configuration process, which generates a virtual configuration of the product based on the user selections embodied by the requests. Often, the application then derives a price quotation based on the configuration, which can be transmitted back to the user for display by the browser.

The application server typically interfaces with a database that, at a minimum, is a repository for information characterizing or modeling all of the possible components that may be requested or required to be configured as part of the system. The model maintains the components and their attributes, as well as any constraints that must be met during the installation of those components within a system. Often the model is defined using an object-oriented language that represents components as classes specifying attributes and constraints of each class of component. The attributes and constraints are given values upon each instantiation of a member of the class, and the constraints must be met during installation of each instantiation within the system configuration. The model may represent the classes of components hierarchically using a number of criteria.

One very important hierarchical criterion is product line. A product line hierarchy defines classes of components all of which are compatible with one another (i.e. the manufacturer typically has qualified the components of a given product line as compatible per extensive testing). Some components may be shared across product lines. For example a system rack or chassis may be shared across many server product lines, even though the components residing in the chassis may be quite different for different product lines. Organizing classes of components in accordance with their product lines permits significant simplification of the model because the model does not have to comprehend all of the attributes that make the components of a product line compatible with one another. Rather, the model can be built under the simple assumption that classes of components belonging to a given product line work together, subject to more specific constraints regarding their installation with one another. Such constraints may include components that are required to be installed along with the requested component, or demands for connections between components.

Constrained by the requests from the buyer, as well as those constraints associated with each component as specified by the model, the components are typically instantiated and then installed by a configuration engine. Some configuration engines are incremental in nature, and they install one component at a time. If the component can not be successfully installed as part of the current configuration, the configurator backs up and tries to find another component candidate that meets the requests of the user and that is compatible with the current state of the configuration. If no such component can be found, the configurator backs up to a previously installed component, and attempts to select another from a list of candidates for that component. The configurator iteratively performs this process until a workable combination of components has been assembled, or it becomes clear there is no workable combination. One example of an incremental configurator is disclosed in U.S. Pat. No. 5,515,524 entitled, "Method and Apparatus for Configuring Systems," which is incorporated herein in its entirety by this reference.

Configurators such as the one described above use statements such as requires_component or the like to create decision points for the configurator to choose between viable candidates for components to be installed, for example, as required by the installation of another component. Typically, the installation process as well as the decision as to what additional component to instantiate and then install in response to a requires_component is performed by a configuration engine in view of the constraints for those components in the model. The engine is typically optimized to search for possible candidates to satisfy a requires_component, based on the product line attribute. A candidate queue is generated containing all of the possible choices that meet the class of components defined by the requires_component statement and that fall into the appropriate product line. The engine proceeds to instantiate and then to attempt installation starting with the first candidate in the queue, and so on until installation is successful. The instantiation of an object component and the installation of that object in response to a requires_component statement may also lead to additional requires_component decision points as dictated by the constraints of each component being instantiated and installed.

Thus, the configurator benefits from the use of the product line hierarchy to limit the number of components in a candidate queue to only those components compatible with the other components already installed in the configuration. Sellers often have vast numbers of components spanning numerous product lines that are included in a model used to configure their systems. Thus, were the list of candidates to include all components of all product lines, the candidates list would become enormous and unwieldy. This technique for keeping candidates queues small and manageable works quite well for homogenous systems or products (i.e. those systems configured from components belonging to a single product line). When a buyer desires to configure a system that combines product components from different product lines (i.e. heterogeneous systems or products), however, keeping candidate queues small becomes problematic. This is because the engine must be able to "see" all possible candidates that can be included in the overall configuration, which spans the multiple product lines to be included in the system configuration.

The inclusion of components in decision candidate queues from two or more product lines can result in an exponential growth of potential candidates from which the configurator may choose components to satisfy component requirements of other components being installed in the configuration of the system or product. The configuration of components from multiple product lines might occur if, for example, a buyer wishes to mix two servers each from a different product line in one larger system in which the servers share a common rack and perhaps a shared external memory or a PDU. The components of the shared memory or PDU typically belong to the product lines of both servers. The two servers may also share a system rack that belongs to both product lines.

Often, the process of configuring a shared resource such as a PDU results in the bringing in of a component by a subsystem in one product line (such as the first server) into a second subsystem in a second product line (such as the second server). The instantiation of the component typically is not a problem because the component probably falls into both product lines. But constraints on the installation of this component common to both product lines may generate subsequent requires_component decision points that must be satisfied by the components that fall exclusively within the product line of the second subsystem. Thus, unless all components from all product lines are available, satisfaction of these subsequent requires_component statements may include incompatible components. Of course as previously discussed, failing to restrain the choice of components to one product line context makes configuration of these heterogeneous systems arduous.

Prior techniques employed to configure heterogeneous systems or products have been difficult to implement and are not very flexible. One technique that has been employed in the past is to configure the heterogeneous system or product in a default product line that includes all product lines of the components represented in the model. But, to keep the candidate queues down to a manageable size, filtering logic had to be written around the decision points to be sure that changes in product line context were made manually at the appropriate points In this way, the model could track when the installation of a component in one product line generates a requires_component or "demand" to install or re-install a component that would also require a change in the product line context to operate correctly, as well as when to change the context back to the previous state or a different state. In this way, only those candidates are included as choices that are actually compatible with a component object the installation of which generated the requires_component or other decision point statement. This technique is extremely complex and burdensome to the modeling process, however, because the logic must be manually constructed for each decision point to keep track of the situations during the configuration process when product line contexts are switched as the configurator moves from one subsystem to another.

Those of skill in the art will recognize that the product line is not the only context which a configurator may wish to dynamically switch between states. Others may include, for example, current component availability in inventory, the country in which the configured system is to work (which may affect choice of components), and many other contexts relevant to the automated configuration of systems.

Therefore, it would be desirable to provide a generic technique whereby a configurator can freely and dynamically switch between product line frames of reference (or other contexts) while configuring heterogeneous, thereby satisfying the decision points during configuration without flooding the configurator with too many choices and without requiring the model to be manually programmed to take account of the circumstances that might lead to a context switch. Moreover, it would also be desirable if the technique was easy to implement and independent of the model.

SUMMARY OF THE INVENTION

The heterogeneous configurator of the invention employs a process by which the configurator may configure components that span several contexts, such as product lines without undo burden being placed on a model used to represent the components. The components are represented in the model as a class called component. The class includes a constraint that requires each instantiated object to determine whether the context that is appropriate to the component object is the same as the current context state for the configuration. If the answer is no, the installation of the object changes the current state of the configuration to the state appropriate to it. The appropriate state may be associated with the object component in a number of ways, including an attribute associated with the object or by the context subsystem in which it resides. Each time a decision point statement such as a requires_component is encountered by the configuration engine, the current state of the context of the configuration is cached locally just in case the installation of the required object changes the current state of the context. Once installation of the object is completed, if its installation resulted in a change of the context state, the cached context is restored before proceeding to the next step in the configuration. If the installation of the object generates additional decision point statements, their execution is processed in the same way. Thus, if any of them results in a change of state, the changes in state are nested and are restored as the installation of their object components are completed.

Contexts may include current inventory, country of purchase or any other context in which it is desirable to limit the choices for components in response to a decision point statement based on the state of the context.

Another embodiment is directed to a server adapted to generate a configuration. The server includes a cache configured to hold a current context state in response to a requirement for the installation of a component, wherein the component is one of a plurality of components each having an associated context state, said context state equal to one or more of a plurality of values; a change module adapted to change the current context state to the associated state of the context if they are not equal; an install module adapted to install the component as part of the configuration; and a restore module adapted to restore a cached state of the context upon a completion of an installation of the component.

BRIEF DESCRIPTION OF THE DRAWINGS

The heterogeneous configurator of the invention may be better understood, and its numerous objectives, features and advantages made apparent to those skilled in the art by referencing the accompanying drawings. The use of the same reference number throughout the several figures designates a like or similar element.

DETAILED DESCRIPTION

Overview

Figure 1:
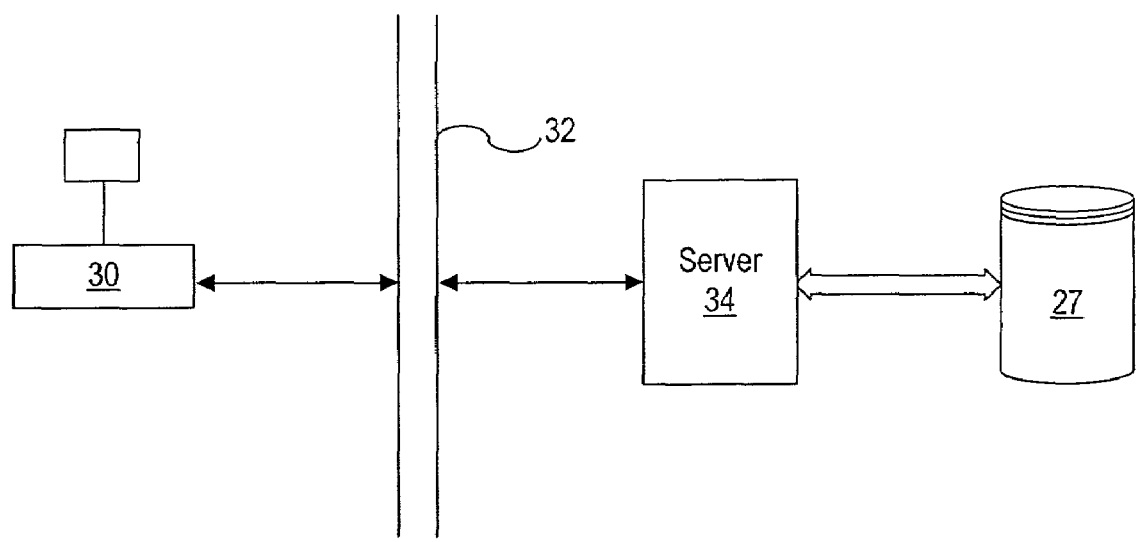
FIG. 1 illustrates one network system in which the heterogeneous configurator of the invention may be implemented.

One embodiment of the heterogeneous configurator method and apparatus of the invention includes a model representing a plurality of components, each of the components spanning two or more contexts such as two or more product lines. The components are organized into a context hierarchy, such as a product line hierarchy. The model can be coded using a configuration modeling language that establishes decision points through statements such as requires_component or "demand" or like statements appurtenant to the particular language used. The model provides a context attribute for each of the components. The model may also contemplate the creation of subsystems which provides localized segmentation of components in a configuration by which particular groups of components are segregated from others as being part of a particular portion of the entire system, and which can be limited to a single context. The model includes a constraint introduced at the highest level of the class hierarchy for the class component. This constraint requires an instantiated object of the class component to always determine what its context (e.g. product line) should be. The execution of this constraint can be accomplished using the context of a subsystem to which the object belongs as an indication of its appropriate context, or it may be some attribute associated directly with the component.

Upon commencing configuration, the configurator may begin in an undefined or general initial context state such as a default product line which can include all product lines encompassed by the model. Initially, the current state of the context (e.g. product line) is cached in response to a design point statement such as a requires_component. The required object is instantiated and installation of the required object is undertaken. At this time, the constraint is evaluated that determines the appropriate context for the required object. If the appropriate context is not equal to the current state, the current state of the context is changed to that of the object under installation and installation is completed. Any subsequent requires_component instructions that are the result of constraints generated by the installation of the required object will also likely be of the same context and are dealt with in the same manner. If any of the subsequent requires_component objects are appropriate to a different context, the state is changed again. Whenever an object completes its installation, including all requires_component instructions that are generated during the installation, the cached context state is restored and configuration continues from there.

In this manner, any number of context state switches may occur from a certain point in the configuration process, and because the current state of the context is always cached and restored, the changes in context state do not impact any level of the configuration process. Changes in context that occur as a result of embedded installations of components required by the installation of other object components become nested, and they pop back up to the top state as they are completed. This approach is completely generic to the model because the decision points are all "wrapped" with an instruction to cache a change in context state at the beginning of the requires_component and to restore the cached context state if the context had changed as part of completing requires_component instructions generated by its own installation. Moreover, the installation of each object requires the object to determine its appropriate context, and to change that state if the current state is not the appropriate context.

The result of wrapping the decision point statements with a "cache" and "restore" functions permits the configuration process to easily and dynamically move from one context state to the next as dictated by the constraints and requirements of the components as modeled, and which keeps the candidate queue limited to one product line. Based on the invention, the model does not have to be written in a manner that contemplates the possible moves from one context state to the next.

Structure

FIG. 1 illustrates one possible hardware embodiment of the configurator of one embodiment of the invention. Client system 30 (e.g. a personal computer) is coupled to an application server 34 over a network connection 32. Client 30 executes a UI and Client 30 transmits control information (i.e. state and alphanumeric data) received through the UI to the application server 34 over the network 32. The control information is then incrementally processed into packages of configuration requests and the configurator satisfies configuration requests with reference to rules and constraints stored in the knowledge-based model KB 27, and across multiple context states as described herein. The configurator may then transmit information back to the client 30 over network 32 concerning the state of the configuration, quotes, etc.

In another embodiment, the network 32 may be the Internet. In this case, the client 30 is typically coupled to application server 34 over the Internet by way of a web server application. The client 30 typically initiates communications with the web server application using a browser program executed by the client 30. The web server application then passes information transmitted to the web server application from the client 30 to the configurator application running on server 34 for processing. Likewise, the web server application passes information from the configurator application running on application 34 back to the client 30 over the Internet 32. The web server application can often be run using the same server as the configurator application (i.e. server 34). Of course, the client 30 may also be coupled to the application server 34 directly rather than over a network 32. Those of skill in the art will recognize that there are many known techniques by which to implement the configurator of the invention, depending upon the context of its application.

Methodology

The class used to represent the class component in the model includes a constraint that requires each component upon its installation to check to determine whether the current context state is appropriate for it and if not, to change the context to its appropriate state. This appropriate state may be included as an attribute, or can be determined indirectly based on a subsystem to which the component belongs. The segregation of components of a configuration into context subsystems is disclosed in U.S. patent application Ser. No. 09/704,455, entitled "Context Subsystems for System Configurations," filed Nov. 1, 2000 and which is incorporated herein in its entirety by this reference. The installation of an object from the model is therefore used to set the current state of the context to be that which is appropriate for the required object component. Such contexts may include the product line, country of operation, current availability or any other context which may be deemed useful in the configuration of systems. The model can be compiled or the engine can then be designed to wrap all requires_component or similar decision point instructions with a function that caches the current context state, and restores the context to the cached state once the decision point instruction has been satisfied (i.e. installation is complete).

Figure 2:
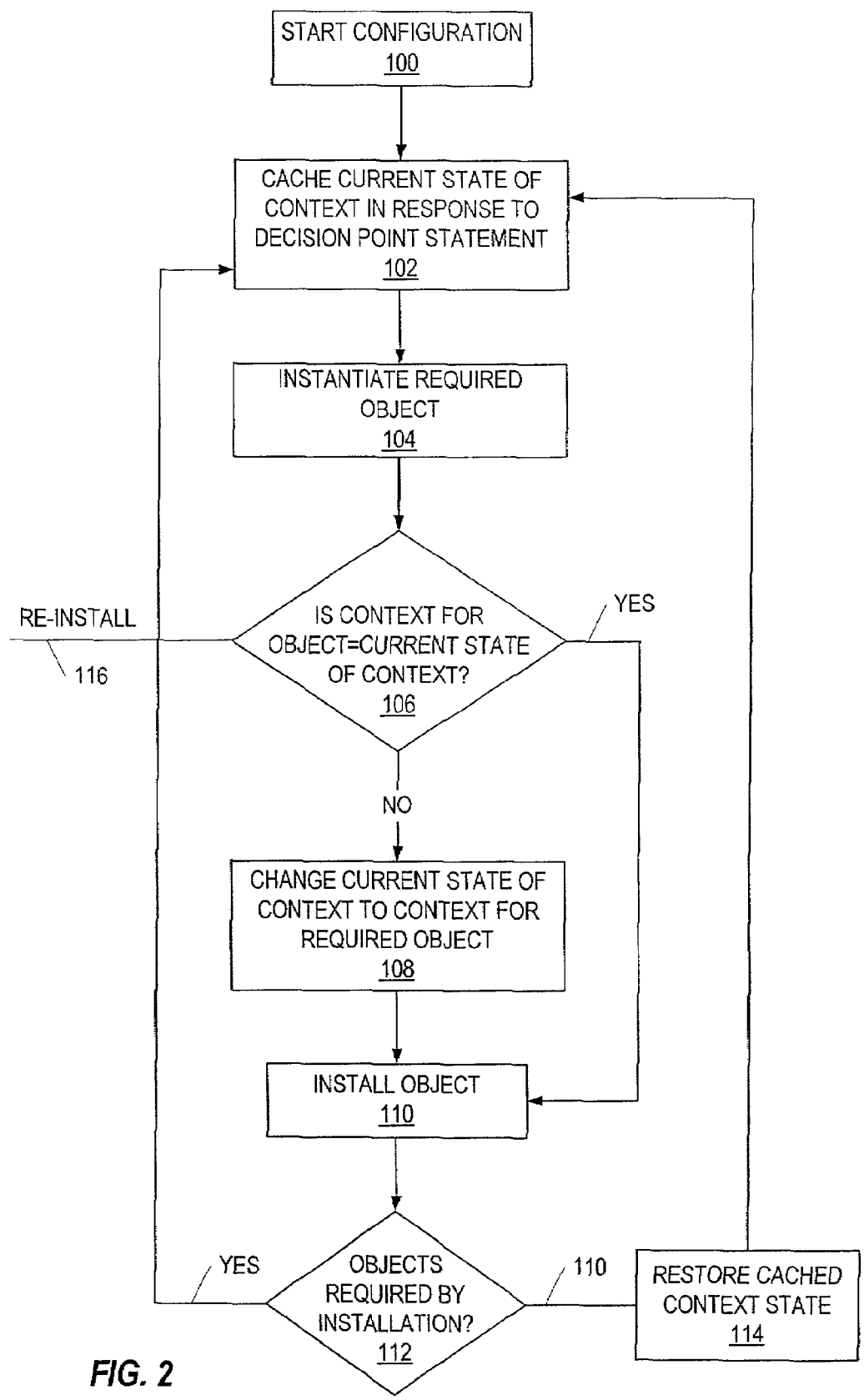
FIG. 2 illustrates one possible representation of the procedural flow of one embodiment of the method of heterogeneous configuration of the invention.

One possible procedural flow of one embodiment of the invention is illustrated with respect to FIG. 2. The configuration process may begin at processing block 100. At processing block 102, the current state of the context is cached in response to a decision point statement requiring an object component. The object is than instantiated based on the decision point instruction as indicated by block 104. As installation of the instantiated object is commenced, one of the first constraints evaluated is whether the context appropriate to the component is equal to the current state, as represented by decision block 106. As previously discussed, this can be based on an object associated with the component that is derived from an attribute or from a context subsystem to which the component is to belong. If the state is the same as the current state, installation is continued at block 110. If the installation requires additional object components as indicated by decision block 112, additional decision point instructions will be generated for those object components. If such objects are required by the installation, the process continues back at block 102, at which point the first of such instructions is handles in precisely the same way. If no other objects are required by the installation, processing resumes at block 114 where it is determined that because the context was not changed, the state does not have to be restored and processing continues at block 104 if additional components are to be configured.

If at decision block 106 it is determined that the current state of the context does not equal that which is required by the object, the current state is changed to that required by the object being installed, as indicated by block 108. Processing then continues at block 110, where installation resumes and at decision block 112 where it is determined whether installation of the object requires additional objects. If yes, processing resumes at block 102, where any additional decision point instructions are processed as previously described. If the answer at 112 is no, then processing continues at block 114, where it is determined that the context state was switched, and the cached state of the context is then restored before processing continues. If any of the subsequent decision point statements itself requires a change of context state, then the changes in state become nested, as each decision statement has its own current context state cached locally to that statement. Once installation of each object is completed, the previous cached state is always restored prior to continuing the processing of the next decision point statement which generated the just installed object.

As indicated by FIG. 2, the invention is also compatible with instantiations of objects that occur in a manner other than by a decision point statement, such as when a configuration initiates a reinstall of a subsystem that is dependent upon another subsystem or component that may have been replaced by the configuration process for some reason. For example, if two servers share a PDU, once the second server is connected to the PDU, the presence of two servers triggers a requires_component for a PDU that is larger. Thus, the installation of the bigger PDU requires that the original one be deleted. The engine detects that the first server has lost a connection to a PDU, and requires that the first server reinstall itself. All of the objects in the first server have already been instantiated, but they reinstall themselves until ultimately, a new connection is established by the existing PDU. The reinstallation process essentially begins after the instantiation block 104 at decision block 106, where it is determined that the current context state may be for subsystem server 2. Thus, reinstallation of a first component of server 1 will switch the product line back to the context state appropriate to server 1 such that only components from that context will be available to satisfy the reinstallation process.

Thus, the invention permits the configurator to move dynamically between contexts such as product lines while maintaining the candidate queues at each decision point to only those components that belong to (i.e. have the attribute for the current state of the context). The model does not have to otherwise be designed to be cognizant of when the switches between context states are required, as the process is completely transparent to the model. This renders the model far less complex and makes the invention applicable to models that already exist, as well as those yet to be designed. As previously discussed, the "cache" and "restore" functions may be wrapped around all of the generated decision point statements (e.g. requires_component). This eliminates the need to alter the code of an otherwise working model or working engine.

Embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. While the invention has been described with respect to the embodiments and variations set forth above, these embodiments and variations are examples and the invention is not to be considered limited in scope to these embodiments and variations. Accordingly, various other embodiments and modifications and improvements not described herein may be within the spirit and scope of the present invention, as defined by the following claims and their equivalents. More specifically, the invention is neither limited by the types of computers used as servers, nor the operating systems, web server or database server application software run on such servers. The invention is limited neither by the types of user terminals used to connect to the servers, nor the type of browser software resident on the terminals. The invention is neither limited by the structure of the data as stored in the database, nor is it limited by the nomenclature used in identifying data types and attributes. Other embodiments and variations are within the scope of the invention, as defined by the appended claims.

What is claimed is:

1. A method of generating a configuration comprising a plurality of components each having an associated context, said associated context equal to one or more of a plurality of values, said method comprising:

storing a current first context state in response to a requirement for the installation of a first component, wherein the first component is one of the plurality of components and the first context state represents state of a context to which the first component belongs and the context represents a limitation of choices for components;

changing the current state of the context to a context state corresponding to the context associated with the first component if the current first context state and the context associated with the first component are not equal;

installing the first component as part of the configuration;

upon installing the first component as part of the configuration, changing a first state of the configuration to a second configuration state that includes the first component; and restoring the stored first context state upon completing installation of the first component without changing the second configuration state.

2. The method of claim 1 wherein the configuration comprises the configuration of a product that is a member of the group consisting of: automobiles, computer hardware, computer software, professional service products, financial service products, medical products, pharmaceutical products, and construction products.

3. The method of claim 1 wherein the context associated with the first component represents a limited set of additional components that are compatible as additions to a particular configuration with the first component.

4. The method of claim 1 wherein the context associated with the first component represents a class of components that are compatible as additions to a particular configuration with the first component.

5. The method of claim 4 wherein each component is associated with a context attribute that allows identification of the context of each component, the method further comprising:

processing the context attribute associated with the installed first component to determine the context associated with the installed first component.

6. The method of claim 1 wherein each associated context is a member of the group consisting of: a product line comprising compatible components, a current inventory, and a country of purchase.

7. The method of claim 1 further comprising:

as a result of installing the first component as part of the configuration, installing one or more additional components, wherein each additional installed component has an associated context; and storing nested context states associated with each context of each additional installed component; and restoring a stored state of the context upon completing installation of the component further comprises restoring the stored state to an immediately preceding stored nested context state upon completing installation of each additional component by restoring the nested context states in reverse.

8. The method of claim 1 wherein if the first context state and the context associated with the first component are equal, the method further comprises:

retaining the first context state as the current context state;

installing the first component as part of the configuration while retaining the first context state as the current context state; and upon installing the first component as part of the configuration, changing a first state of the configuration to a second configuration state that includes the first component while retaining the first context state as the current context state.

9. The method of claim 1 further comprising:

storing the current first context state in response to a requirement for the installation of a second component, wherein the second component is one of the plurality of components;

changing the current state of the context to a context state corresponding to the context associated with the second component if the current first context state and the context associated with the second component are not equal;

installing the second component as part of the configuration;

upon installing the second component as part of the configuration, changing the second configuration state to a third configuration state that includes the second component; and restoring the stored first context state upon completing installation of the second component without changing the third configuration state.

10. The method of claim 1 wherein changing a state of the configuration to a second configuration state that includes the first component further comprises:

including one or more first additional components in the second configuration state if installing the first component as part of the configuration requires including the one or more first additional components; and removing one or more second additional components in the second configuration state if installing the first component of the configuration requires removing the one or more second additional components.

11. The method of claim 1 wherein the plurality of components of the configuration are selected from a group of components, the method further comprising:

upon installing the first component as part of the configuration, determining whether to install one or more additional components based upon installation of the first component; and if one or more additional components are to be installed based upon installation of the first component, selecting the one or more additional components to be installed, wherein the context associated with the first component limits available choices from which the one or more additional components can be selected to a subset of the group of components.

12. A computer system adapted to generate a configuration, the computer system comprising:

a processor; and a memory coupled to the processor and configured to store a current first context state in response to a requirement for the installation of a first component, wherein the first component is one of a plurality of components each having an associated context, said associated context state equal to one or more of a plurality of values and the first context state represents state of a context to which the first component belongs and the context represents a limitation of choices for components, wherein the memory further includes code executable by the processor to:

change the current first context state to a context state corresponding to the context associated with the first component if the current first context state and the context associated with the first component are not equal;

install the first component as part of the configuration;

change a first state of the configuration to a second configuration state that includes the first component upon installation of the first component as part of the configuration; and restore the stored first context state upon a completion of an installation of the first component without changing the second configuration state.

13. The computer system of claim 12 wherein the configuration comprises the configuration of a product that is a member of the group consisting of: automobiles, computer hardware, computer software, professional service products, financial service products, medical products, pharmaceutical products, and construction products.

14. The computer system of claim 12 wherein the context associated with the first component represents a limited set of additional components that are compatible as additions to a particular configuration with the first component.

15. The computer system of claim 12 wherein the context associated with the first component represents a class of components that are compatible as additions to a particular configuration with the first component.

16. The computer system of claim 15 wherein each component is associated with a context attribute that allows identification of the context of each component and the memory further includes code executable by the processor to process the context attribute associated with the installed first component to determine the context associated with the installed first component.

17. The computer system of claim 12 wherein each associated context is a member of the group consisting of: a product line comprising compatible components, a current inventory, and a country of purchase.

18. The computer system of claim 12 wherein:

the memory is also configured to store nested context states in response to a requirement for the installation of additional components due to the previous installation of other components and each additional installed component has an associated context; and the memory further includes code executable by the processor to restore the stored state of the context upon completing installation of each additional component by restoring the nested context states in reverse.

19. The computer system of claim 12 wherein if the first context state and the context associated with the first component are equal, the memory further includes code executable by the processor to:

retain the first context state as the current context state;

install the first component as part of the configuration while retaining the first context state as the current context state; and upon installation of the first component as part of the configuration, change a state of the configuration to a second configuration state that includes the first component while retaining the first context state as the current context state.

20. The computer system of claim 12 wherein the memory further includes code executable by the processor to:

store the current first context state in response to a requirement for the installation of a second component, wherein the second component is one of the plurality of components;

change the current state of the context to a context state corresponding to the context associated with the second component if the current first context state and the context associated with the second component are not equal;

install the second component as part of the configuration;

upon installation of the second component as part of the configuration, change the second state to a third configuration state that includes the second component; and restore the stored first context state upon completing installation of the second component without changing the third configuration state.

21. The computer system of claim 12 wherein:

the second configuration state also includes one or more first additional components in the first configuration state if installation of the first component as part of the configuration requires including the one or more first additional components; and the second configuration state excludes one or more second additional components in the first configuration state if installation of the first component of the configuration requires removing the one or more second additional components.

22. The computer system of claim 12 wherein the plurality of components of the configuration are selected from a group of components and the memory further includes code executable by the processor to:

determine, upon installation of the first component as part of the configuration, whether to install one or more additional components based upon installation of the first component; and select the one or more additional components to be installed if one or more additional components are to be installed based upon installation of the first component, wherein the context associated with the first component limits available choices from which the one or more additional components can be selected to a subset of the plurality of components.

23. An apparatus for generating a configuration comprising a plurality of components each having an associated context, said associated context equal to one or more of a plurality of values, said method comprising:

means for storing a current first context state in response to a requirement for the installation of a first component, wherein the first component is one of the plurality of components and the first context state represents state of a context to which the first component belongs and the context represents a limitation of choices for components;

means for changing the current state of the context to a context state corresponding to the context associated with the first component if the current first context state and the context associated with the first component are not equal;

means for installing the first component as part of the configuration;

means for changing a first state of the configuration to a second configuration state that includes the first component upon installing the first component as part of the configuration; and means for restoring the stored first context state upon completing installation of the first component without changing the second configuration state.

24. The apparatus of claim 23 wherein the plurality of components of the configuration are selected from a group of components, the apparatus further comprising:

means for determining, upon installation of the first component as part of the configuration, whether to install one or more additional components based upon installation of the first component; and means for selecting the one or more additional components to be installed if one or more additional components are to be installed based upon installation of the first component, wherein the context associated with the first component limits available choices from which the one or more additional components can be selected to a subset of the plurality of components.

25. A computer program product having code executable by a processor stored thereon to generate a configuration comprising a plurality of components each having an associated context, said associated context equal to one or more of a plurality of values, wherein the code is further configured to:

store a current first context state in response to a requirement for the installation of a first component, wherein the first component is one of the plurality of components and the first context state represents state of a context to which the first component belongs and the context represents a limitation of choices for components;

change the current state of the context to a context state corresponding to the context associated with the first component if the current first context state and the context associated with the first component are not equal;

install the first component as part of the configuration;

upon installing the first component as part of the configuration, change a first state of the configuration to a second configuration state that includes the first component; and restore the stored first context state upon completing installation of the first component without changing the second configuration state.

26. The computer program product of claim 25 wherein the code is further configured to:

determine, upon installation of the first component as part of the configuration, whether to install one or more additional components based upon installation of the first component; and select the one or more additional components to be installed if one or more additional components are to be installed based upon installation of the first component, wherein the context associated with the first component limits available choices from which the one or more additional components can be selected to a subset of the plurality of components.

* * * * *